May 3, 1960

W. E. BURRELL 2,935,159

FLANGE LUBRICATING SYSTEM

Filed Feb. 9, 1959

INVENTOR
William E. Burrell

BY

AGENT

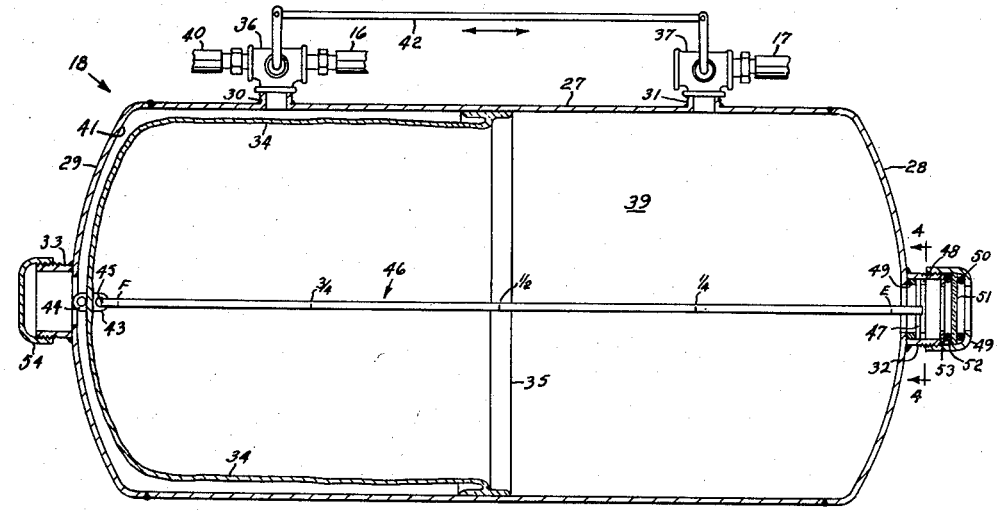

United States Patent Office 2,935,159
Patented May 3, 1960

2,935,159

FLANGE LUBRICATING SYSTEM

William E. Burrell, Portland, Oreg.

Application February 9, 1959, Serial No. 792,066

3 Claims. (Cl. 184—3)

This invention relates generally to methods and means for greasing the wheel flanges and rail top side flanges of the trains and road rails of railway systems.

Attention is called to my U.S. Patent No. 2,885,029 which issued May 5, 1959, from my application S.N. 587,677 filed May 28, 1956, of which this application is a continuation in part.

It will be understood that a rail and wheel flange greaser as previously disclosed in my application S.N. 587,677 comprises a relatively large grease tank to which air under pressure is applied to force the grease from the tank to a metering device and from the metering device to a grease applicator at the wheel flange. The locations of the various elements of the device and the details of construction of the metering device together with one form of tank and one form of applicator are completely disclosed in S.N. 587,677 and to some extent repeated here since the Patent Office required that the claims of S.N. 587,677 be restricted.

It is the primary object of this invention to provide a flange greasing means for a locomotive wheel flange which means would include a source of grease under pressure which through a metering device would feed a specifically desired flange grease applicator.

It is a second object of this invention to provide a flange greasing means for a locomotive wheel flange which means would include a flange grease applicator, means for metering the flange grease to the applicator and a container for grease under pressure from which container grease is fed to the metering means as required and available at the container, the container including means continuously indicating the remaining grease available therein.

How these and other objects are attained is made clear by the following specification referring to the attached drawings in which—

Fig. 3 is a sectional view of a grease storage tank similar to that shown in Fig. 1.

Fig. 4 is a sectional elevation along the line 4—4 of Fig. 3.

Fig. 5 is an enlarged fragmentary side elevation of the form of applicator of this invention as shown applied with the left hand wheel of Fig. 1.

Fig. 6 is a sectional view along the line 6—6 of Fig. 5.

Like numerals of reference refer to like parts in the several figures of the drawings.

Figure 1:
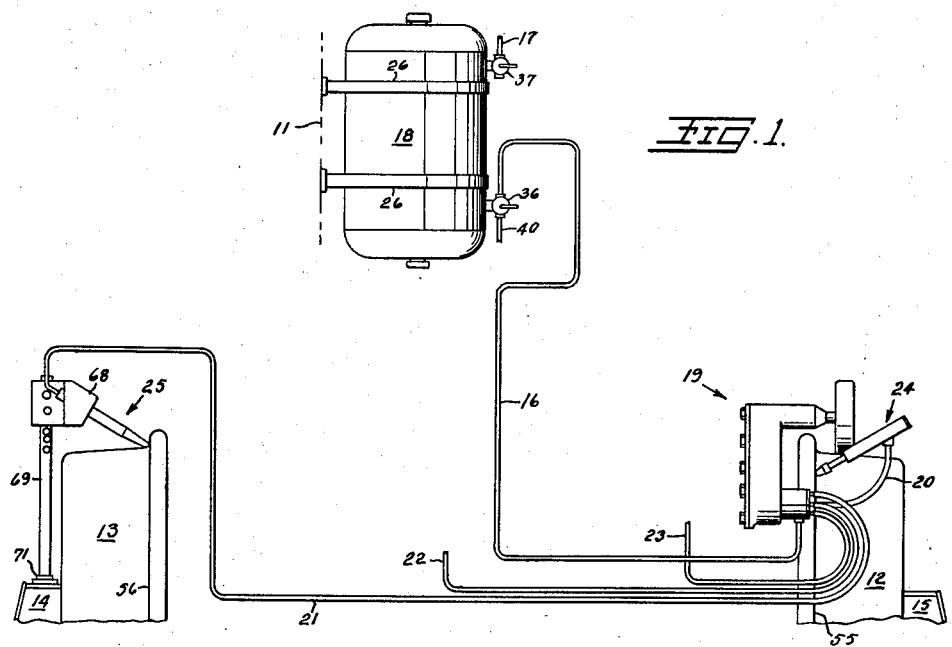
Fig. 1 is a somewhat schematic drawing showing the principal elements of the invention.

Referring now to the drawings there is shown in scheme only a part 11 of a locomotive frame which by means not shown is carried on multiple sets of one axle and two wheels, the two wheels 12, 13 of one axle (not shown) being indicated. Bearing boxes 14, 15 are parts of frame 11 in which the bearings (not shown) are placed to support frame 11 on the axles of wheels like 12 and 13. Wherever solid steel flanged wheels are run on steel rails there is lateral rubbing and grinding of the wheel flanges on the rails and continuously grease must be supplied to a forward wheel flange on each side of the train in order that the wheel flange will apply grease to the rail flange to prevent wear of the rail and the following wheels. In Fig. 1 it is seen that pipe 16 supplies grease from tank 18 under pressure of air from air pipe 17 to grease metering device 19 which as fully described in application S.N. 587,677 will operate during operation of wheel 12 in either direction to deliver grease under pressure to any of the pipes 20, 21, 22, 23 at their individually required rates of grease delivery. In the present case we are not using pipes 22, 23 so nothing more will be said of them. It is seen that pipes 20 and 21 deliver grease at individual rates preset at metering device 19 through pipes 20 and 21 to grease applicators 24 and 25 of wheels 12, 13 respectively.

The construction and operation of metering device 19 is completely described and explained in application S.N. 587,677 and will not further be discussed here.

A particular feature of this invention is the functionally designed and constructed grease storage tank 18 which can be secured by any desired form of hangers 26, 26 to frame 11 as shown in Fig. 1. As shown in Fig. 3 tank 18 includes a cylindrical shell 27 about 32 inches long and 16 inches diameter with two dished ends 28, 29 welded thereto. Along one side of shell 27 are welded thereon a pair of one-inch pipe half couplings 30, 31 and into the ends 28, 29 are welded respectively two-inch pipe half couplings 32, 33.

Before the second head 28 or 29 is welded onto shell 27 the tough, resilient flexible piston or diaphragm 34, made of neoprene or other grease resistant material, is adhesively secured at its open end by its band 35 to the interior surface of shell 27 at its midlength.

Tough, resilient diaphragm or flexible piston 34, being axially unrestrained except by the air and grease pressures on opposite sides thereof is seen to be the equivalent of a free piston continuously axially movable to a balanced pressure position within its cylinder.

A pair of three way stop cocks 36, 37 are seen respectively to be threadedly engaged on half couplings 30 and 31. Pipe 16 is connected to one of the alternate ends of three way cock 36, the other end of which is available for attachment to the hose 40 of a grease pump or other means for refilling the tank 18 with grease. Pipe 17 connected to one of the alternate ends of cock 37 has its other end connected with an air pressure line on the locomotive. The other alternate end of cock 37 remains open to atmosphere. Thus on the right side of diaphragm 34 the interior space 39 of shell 27 can be opened to atmosphere by throwing the handle of cock 37 toward its open end or can be filled with air under pressure by throwing the handle of cock 37 the other way. And with the handle of cock 37 thrown to open tank space 39 to atmosphere the handle of cock 36 can be thrown to open the interior space 41 to the left of diaphragm 34 in tank 18 to hose 40 to fill the space 41 with grease. Since space 41 will be receiving grease under pressure and space 39 will be open to atmosphere diaphragm 34 will move to the other end of the tank and space 41 will include substantially the whole interior of the tank.

When the tank is thus filled with grease the handles of cocks 36—37 can be turned in the other direction to put air pressure in space 39 to the right of diaphragm 34 and connect space 41 to pipe 16 so that grease from space 41 will be delivered as required to metering device 19 as soon as the locomotive moves in either direction.

It is seen that the handles of cocks 36, 37 may be connected by bar 42 to coordinate the operations of filling tank 18 and putting it back into service.

Axially into diaphragm 34 and extending from each side thereof is a loop 43, 44. To loop 43 in the air space 39 the end 45 of a negator spring 46 made by the Hunter Spring Co. of Lansdale, Pa., is secured. The negator is a strip of essentially flat spring steel slightly curved transversely thereof. The spring has the nature of wanting to curl about a transverse axis and to flatten transversely as it curls about a transverse axis. In extension the spring extension resistance is entirely a resistance to longitudinal uncurling and therefore the spring pull is constant or the commonly thought of spring rate is zero. With extension indicating numbers on the side of the spring it becomes a self retrieving indicator for the position of the thing to which it is tied. Thus in Fig. 3 it is seen that the stationary end of negator 46 is curled around a loose pin 47 held in a pair of diametral slots 48 in a collar 49 in half coupling 32. By its natural action the negator maintains itself in tension to wind and unwind as the center of diaphragm 34 moves axially of tank 18. By shutting the air off of space 39 of tank 18 and removing pipe cap 49 spring 46 at pin 47 can be seen and the position of diaphragm 34 indicating the approximate amount of grease in the tank can be seen. But as seen cap 49 is made with a central hole therethrough and carries axially therein in sequence an O-ring seal 50, a disk of safety glass 51, an O-ring 52, and a washer 53 all clamped tightly against the end of half coupling 32. With this construction the amount of grease in the tank can be seen through the glass at any time.

If it should be necessary to place the gage tape 46 on the grease side of diaphragm 34, the slotted collar could be moved into half coupling 33 with pin 47 and the take up end of spring 46. The free end of spring 46 would then be hooked into loop 44 and a standard pipe cap 54 would be used for a cover.

Figure 2:
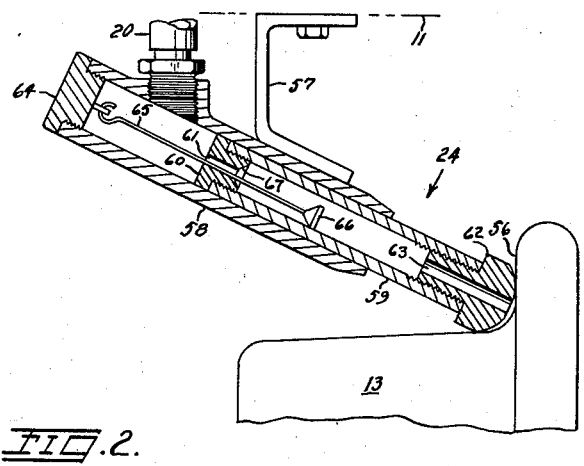
Fig. 2 is a vertical sectional view of the right hand wheel flange grease applicator shown in Fig. 1.
Figure 7:
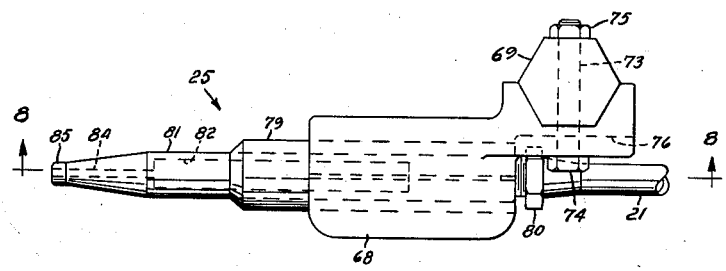
Fig. 7 is a top plan view of the mounted applicator shown in Fig. 5.
Figure 8:
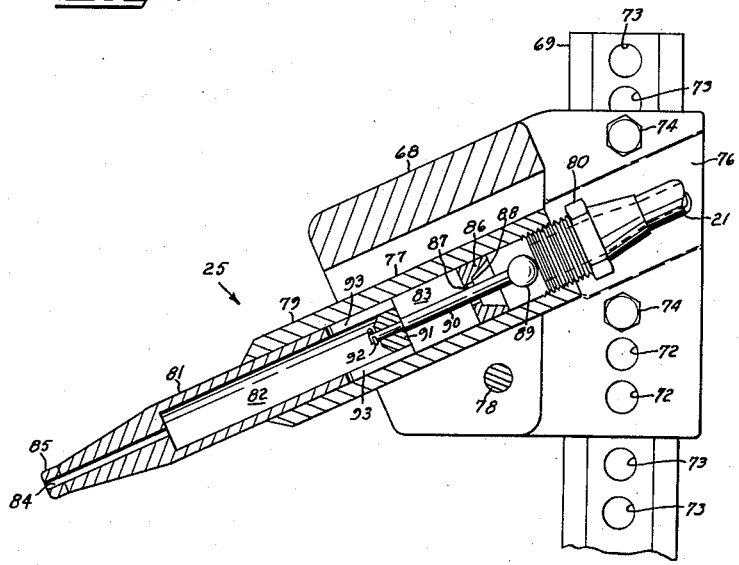
Fig. 8 is a side view in partial section along the line 8—8 of Fig. 7.

As previously noted pipes 20 and 21 from metering device 19 feed grease applicators 24, 25 respectively for flanges 55, 56 of wheels 14 and 13. As shown in Fig. 2, applicator 24 for flange 56 is secured to bracket 57 bolted, as shown, to frame 11. Due to the mounting of the locomotive frame on the wheels there is some relative motion therebetween when the locomotive is in motion. This has the effect of allowing lateral motion of applicator 24 with respect to wheel 14 and flange 55 as the locomotive moves along the track. For this reason applicator body 58 of applicator 24, to the interior of which grease in measured amounts is supplied under pressure by pipe 20, is equipped with a tubular piston 59 slidably positioned therein. Piston 59 includes threaded cap 60 with a grease port 61 therethrough at its interior end and a ball headed cap 62 with a grease port 63 therethrough threaded into its exterior end.

The other end of body 58 of applicator 24 is closed with a blank threaded cap 64 to the inner end of which is hung a wire 65 extending through port 61 and finished with an end 66 larger than port 61 to limit the outer movement and possible loss of piston 59.

End 66 attached to wire 65 is formed as a conical valve to close on conical valve seat 67 formed around the grease outlet end of port 61. Wire 65 and end valve 66 therefore operate to limit the extension of piston 59 and at the same time shut off the discharge of grease therefrom.

It will be noted that in operation as repeated small shots of grease are urged into the interior of applicator body 58 by actuator 19, the space interior of body 58 and piston 59 will first be at least partially filled and the pressure required to put grease through ports 61 and 63 will cause piston 59 to move outwardly until round head 62 strikes wheel 13. Then as additional grease is forced into body 58 an equivalent amount will be forced out through port 63 onto wheel flange 56. Head 62 cannot wear on flange 56 for its contact therewith is always a cause of grease application. In the side to side movement of wheel 13, wheel flange 56 will repeatedly jam against the end 62 of applicator 24 and as quickly move away therefrom but end 62 of piston 59 is continuously reaching out for flange 56 and storing grease in its interior only to extrude the grease onto flange 56 as flange 56 presses piston 59 back into body 58.

Figs. 1, 5, 6, 7, and 8 show the construction, mounting and use of another flange grease applicator 25 somewhat similar and for the same purpose as the above described applicator 24. To avoid most of the relative motion between the grease applicator and the wheel flange which was noted above to be experienced with the mounting of applicator 24 to car frame 11 by bracket 57, it is seen in Fig. 1 that adjustable clamp 68 adjustably supports applicator 25 on post 69 which is fixed to bearing box 14 by welding either directly thereto or with an intermediate flange or fitting such as 71 which may be required to position post 69 so that the axis of applicator 25 will be in a plane including the common axis of wheels 12, 13. Since the wheels 12, 13 run long distances in either direction the axis of applicator 25 should include the wheel axis and for close control of the application of grease to the wheel flange for transfer to the rail it has been found that the axis of applicator 25 should be at an angle of 25 to 30 degrees from the wheel axis.

Clamp 68 is seen to be formed with a series of uniformly spaced holes 72 adapted to provide, at relatively small movements of clamp 68 along post 69, a selected pair of holes which will register with a selected pair of holes 73 through which bolts 74 may be inserted and used with nuts 75 to secure clamp 68 to post 69.

Clamp 68 is formed with a hole 77 therethrough and a continuing groove 76 coaxial therewith to receive applicator 25 positionably therealong. Allen head screw 78 is provided to secure applicator 25 in position along hole 77 and groove 76.

Applicator 25 is seen to include a tubular body 79 internally threaded at one end to receive end fitting 80 of grease supply pipe 21. Slidably positioned in body 79 to extend from the unthreaded end thereof is piston 81 formed with a hollow interior space 82 open at one end to space 83 in the interior of body 79 and open to atmosphere at the other end through axial hole 84. The outer or grease applying end of piston 81 is tapered to a small end which is tipped with a hardened and polished material 85 like Stellite.

Pressed into body 79 inwardly of its threaded end is a rustless metal disk 86 formed with a valve port 87 therethrough. The entrance end of valve port 87 forms a valve seat 88 for spherical valve 89 whose stem 90 extends through keeper 91 to which it is secured by cotter key 92. Keeper 91 is lightly pressed into the inner end of piston 81 the wall of which is diametrically slotted at 93 to pass grease freely around keeper 91.

Valve disk 86 is pressed so firmly in body 89 that when piston 81 is moved outwardly of body 79 far enough to close valve 89 on its seat 88 disk 86 will hold its position against the full pressure of the incoming grease. On the other hand keeper 91 is pressed into piston 81 only firmly enough to control the operation of valve 88, 89. Piston 81 can be pulled manually from keeper 91 for examination or cleaning and can again be inserted into body 79 and pushed onto keeper 91 when keeper 91 is pushed up against valve disk 86. It is seen that either of the applicators 24 or 25 will accomplish the same purpose but in most cases applicator 25 with its mounting will probably be preferred over applicator 24 and its mounting.

Having disclosed the structure and operation of this improved flange lubricating system as a continuation in part of the disclosure of my copending application S.N. 587,677, I claim:

1. A lubricating system for applying grease to a part of a machine continuously at a rate responsive to the frictional motion of said part, said system including a source of grease, a source of air under pressure, applicator means for applying grease to said part, grease metering means for supplying grease to said applicator means at a rate responsive to said motion of said part and tank means for receiving grease from said source to store said grease and to deliver said grease as required to said metering means under pressure from said air, said applicator means comprising a pair of telescopic tubes slidingly sealed together at adjacent ends the outer one of said telescopic tubes being formed at its other end with a grease inlet port through a wall thereof, the inner of said telescopic tubes being formed axially at its other end with a grease discharging hole therethrough, one of said tubes adjacent the inner end of the inner one of said tubes having a barrier secured across the interior thereof with a valve port formed axially therethrough and a valve seat formed in said barrier around the end of said port away from the said inner end of the inner one of said tubes, a valve stem extending loosely through said valve port, a valve secured on said valve stem on the valve seat side of said port, the other end of said valve stem being secured coaxially to the other of said tubes whereby when grease under pressure is applied to said grease inlet port of said outer one of said tubes the pressure of grease within said tubes will cause said inner tube to move axially outwardly of said outer tube until said valve seats on said valve seat to stop the flow of grease and to stop the relative motion of said tubes before said inner tube leaves said outer tube and then when said grease outlet end of said inner tube is pressed against the part to be greased and said inner tube moves into said outer tube to open said valve, grease will be applied to the part to be greased at the rate it is metered into said inlet port of said outer tube.

2. For use in a lubricating system for applying grease to a part of a machine continuously at a rate responsive to a motion of said part, said system including a source of grease under pressure and grease metering means for metering grease under pressure from said source for said part at said rate: applicator means for receiving grease under pressure from a source thereof and applying said grease to a grease needing part, said applicator comprising a rigid inner tube and a rigid outer tube slidingly telescoped together over their inner ends, the outer one of said tubes being formed at its outer end with a grease inlet port through a wall thereof, the inner one of said tubes being formed at its outer end with a grease discharge hole therethrough, one of said tubes adjacent the inner end of the inner one of said tubes including a barrier across the interior thereof with a valve port formed axially therethrough and a valve seat formed therein around the end of said port away from the inner end of said inner tube, a valve stem extending loosely through said valve port, a valve secured on said stem on the valve seat side of said port and the other end of said valve stem secured coaxially to the other of said tubes, whereby, when grease under pressure is applied to said grease inlet port of said outer tube the pressure of grease with said tubes will cause said inner tube to move axially outwardly of said outer tube until said valve seats on said valve seat to stop the flow of grease through said tubes and stop the outward movement of said inner tube and then when said grease outlet end of said inner tube is pressed against the part to be greased and said inner tube moves inwardly of said outer tube to open said valve grease will be applied to the part to be greased at the rate grease is supplied to said inlet port of said outer tube.

3. A grease applicator for receiving grease under pressure metered as desired from a source thereof and applying said grease as required to a grease needing part, said applicator comprising a rigid inner tube and a rigid outer tube slidingly telescoped together over their adjacent inner ends, one of said tubes being formed near its other end with a grease inlet port through a wall thereof, the other of said tubes at its other end being formed with a grease discharge hole therethrough, one of said tubes adjacent the inner end of the inner one of said tubes including a barrier across the interior thereof, said barrier being formed with a valve port axially therethrough and a valve seat formed therein around the end of said port away from the inner end of said inner tube, a valve stem extending loosely through said valve port, a valve attached to one end of said stem on the valve seat side of said port and the other end of said stem being removably secured to the one of said tubes other than the tube including said barrier.

References Cited in the file of this patent
UNITED STATES PATENTS

| | | |
|---|---|---|
| 1,209,805 | Boe | Dec. 26, 1916 |
| 1,241,725 | Emigh | Oct. 2, 1917 |
| 1,911,094 | Skoglund | May 23, 1933 |
| 2,731,297 | Meyer | Jan. 17, 1956 |
| 2,823,768 | Taylor | Feb. 18, 1958 |